(12) United States Patent
Lee

(10) Patent No.: US 11,513,359 B1
(45) Date of Patent: Nov. 29, 2022

(54) LENS

(71) Applicant: Min Ho Lee, Gyeonggi-do (KR)

(72) Inventor: Min Ho Lee, Gyeonggi-do (KR)

(73) Assignee: Min Ho Lee, Gyeonggi-do (KR)

( * ) Notice: Subject to any disclaimer, the term of this patent is extended or adjusted under 35 U.S.C. 154(b) by 0 days.

(21) Appl. No.: 17/681,605

(22) Filed: Feb. 25, 2022

(30) Foreign Application Priority Data

Aug. 23, 2021 (KR) .......................... 10-2021-0111222

(51) Int. Cl.
*G02B 27/01* (2006.01)
*G02B 27/00* (2006.01)
*G02F 1/1335* (2006.01)

(52) U.S. Cl.
CPC ..... *G02B 27/0172* (2013.01); *G02B 27/0093* (2013.01); *G02F 1/133526* (2013.01); *G02B 2027/0178* (2013.01)

(58) Field of Classification Search
USPC ............................................................ 345/8
See application file for complete search history.

(56) References Cited

U.S. PATENT DOCUMENTS

| | | | |
|---|---|---|---|
| 9,019,449 B2 | 4/2015 | Baek et al. | |
| 11,280,997 B1 * | 3/2022 | Gao ..................... | G02B 6/0076 |
| 2012/0242811 A1 * | 9/2012 | Cho ..................... | H04N 13/341 |
| | | | 348/54 |
| 2015/0189266 A1 * | 7/2015 | Zhou .................... | H04N 13/271 |
| | | | 348/54 |
| 2017/0160518 A1 * | 6/2017 | Lanman ............. | G02B 27/0093 |
| 2018/0210208 A1 * | 7/2018 | Zhou .................. | G02B 27/1026 |
| 2018/0306670 A1 * | 10/2018 | Goldberg ........... | G01M 11/0228 |
| 2020/0081250 A1 * | 3/2020 | Mohammed .......... | G02B 30/40 |
| 2020/0379214 A1 | 12/2020 | Lee et al. | |
| 2021/0041948 A1 * | 2/2021 | Berkner-Cieslicki ....... | |
| | | | G06F 3/011 |
| 2021/0241667 A1 * | 8/2021 | Akimoto ............ | G02B 27/0101 |
| 2021/0278630 A1 | 9/2021 | Lee et al. | |

FOREIGN PATENT DOCUMENTS

| | | |
|---|---|---|
| KR | 1020130064333 A | 6/2013 |
| KR | 1020150116142 A | 10/2015 |
| KR | 101928884 B1 | 12/2018 |
| KR | 101976336 B1 | 5/2019 |
| KR | 102038379 B1 | 10/2019 |
| KR | 1020200060825 A | 6/2020 |
| KR | 1020200067980 A | 6/2020 |
| KR | 1020200136297 A | 12/2020 |

* cited by examiner

*Primary Examiner* — Chineyere D Wills-Burns
(74) *Attorney, Agent, or Firm* — Umberg Zipser LLP; Ryan Dean

(57) ABSTRACT

According to the exemplary embodiment of the present disclosure, a lens is disclosed. The lens is located remotely from a display device, and the lens includes: a liquid crystal layer variably oriented according to a voltage so as to have a variable refractive index; and an optical unit accommodated inside the liquid crystal layer, in which the refractive index of the liquid crystal layer is varied, so that the liquid crystal layer may modulate a speed of a change of an image that is being displayed on a display device.

19 Claims, 6 Drawing Sheets

LENS

CROSS-REFERENCE TO RELATED APPLICATIONS

This application claims priority to and the benefit of Korean Patent Application No. 10-2021-0111222 filed in the Korean Intellectual Property Office on Aug. 23, 2021, the entire contents of which are incorporated herein by reference.

TECHNICAL FIELD

The present disclosure relates to a lens, and more particularly, to a lens having a variable refractive index.

BACKGROUND ART

With the development of optical technology, image technology, communication technology, and the like, various types of display devices are being developed, and accordingly, the user experience using the display device is also increasing. As an example of the display device, a Head Mounted Display (HMD) device may be a device that is worn on a user's head and provides an image directly in front of the user's eyes. In particular, the HMD device may provide a three-dimensional (3D) image so that a user can experience Virtual Reality (VR) close to reality. For example, the VR may be a virtual space coated with a photo or video taken with a 360-degree camera. In addition, the HMD device may also provide Augmented Reality (AR) or Mixed or Merged Reality (MR), as well as the VR. Augmented reality may be to project reality and show additional information thereon. MR may be said to arrange a virtual object in a real space, or recognize a real object and form a virtual space around the real object. With the development of the image technology, people's interest in entertainment factors increases, and thus various HMD devices are being developed.

However, the image provided through the HMD device may cause dizziness and motion sickness to users. Motion sickness caused when using an HMD device may be mainly caused by visual factors, unlike motion sickness that is generally caused when using a car or an airplane. Motion sickness may be caused not only from the image provided through the HMD device, but also from the 3D image provided through a monitor connected to a general computer, and may also be caused from the 3D image provided through a TV connected with a home game device. Motion sickness generated when viewing the 3D image is called IT motion sickness, 3D motion sickness, or cyber motion sickness. In order for HMD devices and 3D images to become popular, the development of a technology for preventing motion sickness may be necessary.

PRIOR ART LITERATURE

[Patent Document]
Korean Patent Application Publication No. 10-2015-0116142

SUMMARY OF THE INVENTION

The present disclosure has been conceived in response to the foregoing background art, and has been made in an effort to provide a lens capable of preventing IT motion sickness of a user.

The technical objects of the present disclosure are not limited to the foregoing technical objects, and other non-mentioned technical objects will be clearly understood by those skilled in the art from the description below.

In order to implement the foregoing object, an exemplary embodiment of the present disclosure discloses a lens. The lens is located remotely from a display device, and the lens includes: an optical module configured to induce a change in a physical property of an internal material and change a refractive index, in which the refractive index of the optical module is varied, so that the optical module modulates at least one of a speed of a change of the image and a phase of the image that is being displayed on the display device.

In order to implement the foregoing object, another exemplary embodiment of the present disclosure discloses a lens. The lens is combinable to a display device, and the lens includes: an optical module configured to induce a change in a physical property of an internal material and change a refractive index, in which the refractive index of the optical module is varied, so that the optical module modulates at least one of a speed of a change of the image and a phase of the image that is being displayed on the display device.

The lens may be provided so as to be present closer to the eye of a user using the display device than a display unit of the display device. In addition, the lens may be provided so as to be present optically closer than a display unit of the display device.

The refractive index of the optical module is varied, so that the optical module may delay the speed of the change of the image that is being displayed on the display device or virtually enlarge or reduce the image.

The refractive index of the optical module is varied, so that the optical module may delay the speed of the change of the image that is being displayed on the display device, and a total playback time period of a first image that passes through the optical module and is projected to the eye of a user may be the same as a total playback time period of a second image that is being displayed on the display device. For example, since the control by the modulation operation according to the exemplary embodiment of the present disclosure corresponds to hardware control rather than software control, the control does not directly affect reproduction of images generated by a system.

The optical module may generate at least one of a ghost effect and a distortion effect by modulating the speed of the change of the image.

The refractive index of the optical module may be varied based on a frame rate of the image that is being displayed on the display device.

The amount of change of the refractive index may be determined based on a frame rate of the image that is being displayed on the display device.

The refractive index of the optical module may be varied based on a change of at least one object included in the image.

The refractive index of the optical module may be varied when at least one object moves from proximal to distal or at least one object moves from distal to proximal within the image.

The refractive index of the liquid crystal layer may be varied when a size of at least one object increases or decreases within the image.

When at least one object moves only in left and right directions within the image, the refractive index of the optical module is not varied, and only a left and right directional arrangement state of the liquid crystal layer may be varied.

The amount of change of the refractive index may be determined based on the degree of change of at least one object included in the image.

The refractive index of the optical module may be gradually varied in response to a speed of the change of at least one object included in the image.

In order to implement the foregoing object, another exemplary embodiment of the present disclosure discloses a display device. The display device includes: a display unit: a control unit; and a lens including an optical module that changes a refractive index by inducing a change in a physical property of an internal material, in which the refractive index of the optical module is varied under the control of the control unit, so that the optical module modulates at least one of a speed of a change of the image and a phase of the image that is being displayed on the display unit.

The lens may be provided so as to be present closer to the eye of a user than a display unit.

The refractive index of the optical module is varied under the control of the control unit, so that the optical module delays the speed of the change of the image that is being displayed on the display unit or virtually enlarges or reduces the image.

The optical module may generate at least one of a ghost effect and a distortion effect by modulating the speed of the change of the image.

The display device may further include an eye tracker configured to track the user's eyes, in which the control unit varies the refractive index of the optical module based on a change of an object determined that the user gazes through the eye tracker among at least one object included in the image.

The display device may be a predetermined form of device, such as a Head Mounted Display (HMD) device and a projector, capable of displaying an image.

The technical solutions obtainable from the present disclosure are not limited to the foregoing solutions, and other non-mentioned solution means will be clearly understood by those skilled in the art from the description below.

According to some exemplary embodiments of the present disclosure, it is possible to provide the lens capable of preventing IT motion sickness generated when a user experiences a 3D image.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters. In other examples, well-known structures and devices are illustrated in a block diagram in order to facilitate describing one or more aspects.

DETAILED DESCRIPTION

Figure 1:
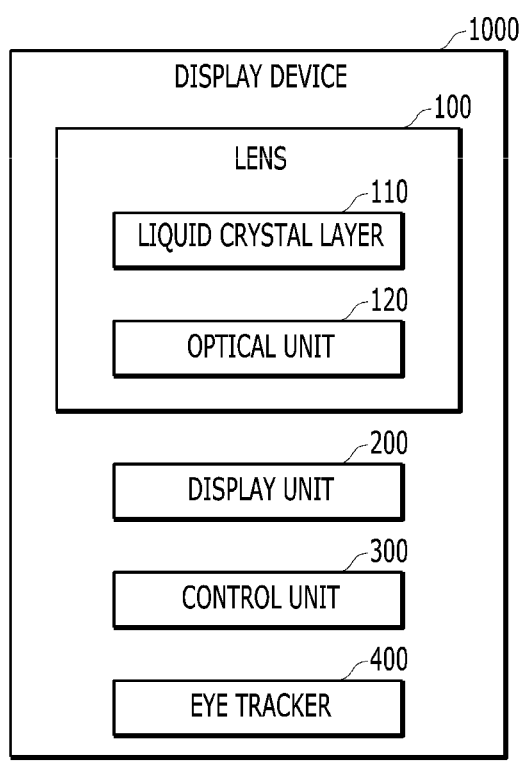
FIG. 1 is a block diagram illustrating an example of a lens according to exemplary embodiments of the present disclosure.

Various exemplary embodiments and/or various aspects will be disclosed with reference to the drawings. In the following descriptions, for explanation, multiple specific details are disclosed in order to provide overall understandings of one or more aspects. However, it will also be appreciated by those skilled in the art that this aspect(s) may be practiced without these specific details. The following descriptions and the accompanying drawings are provided for disclosing specific exemplary aspects of the one or more aspects in detail. However, these aspects are exemplary. Thus, some of the various methods in the principles of the various aspects may be used, and the descriptions are intended to include all such aspects and their equivalents. Specifically, "an exemplary embodiment", "an example", "an aspect", and the like used in this specification may not be construed as any aspect or design described being better or advantageous than other aspects or designs.

Hereinafter, the same or similar constituent elements are assigned with the same reference numerals regardless of reference numerals, and the repetitive description thereof will be omitted. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, the accompanying drawings are provided only to allow those skilled in the art to easily understand the exemplary embodiments disclosed in the present specification, and the technical spirit disclosed in the present specification is not limited by the accompanying drawings.

Terms "first", "second", and the like may be used to describe various elements and components, but the elements and components are of course not limited by these terms. These terms are merely used to distinguish one element or component from another element or component. Therefore, the first element or component mentioned hereinafter may of course be the second element or component within the technical spirit of the present disclosure.

Unless otherwise defined, all terms (including technical and scientific terms) used in the present specification may be used as the meaning which may be commonly understood by the person with ordinary skill in the art, to which the present disclosure belongs. In addition, terms defined in a generally used dictionary shall not be construed in ideal or excessively formal meanings unless they are clearly and specially defined in the present specification.

The term of "or" is intended to mean not an exclusive "or" but an inclusive "or". That is, unless specified or clear in context, "X uses A or B" is intended to mean one of the natural implicit substitutions. That is, "X uses A or B" can be applied to any of the cases where X uses A, X uses B, or X uses both A and B. Moreover, it is to be understood that the term of "and/or" used in this specification refers to and includes all possible combinations of one or more of the listed related items.

It is to be understood that the terms of "comprises" and/or "comprising" mean that the feature and/or a component is provided, but one or more other features, other components and/or the presence or addition of groups thereof are not excluded. In addition, unless specified or clear in the context of indicating a singular form, the singular in this specification and claims should generally be construed to mean "one or more".

The terms "information" and "data" used in the present specification may sometimes be interchangeably used.

When an element or layer is referred to as being "on" another element or layer, it can be directly on the other element or layer or intervening elements or layers may be present. In contrast, when an element is referred to as being "directly on" another element or layer, there are no intervening elements or layers present.

Spatially relative terms, such as "below," "beneath," "lower," "above," "upper," and the like, may be used herein for ease of description to describe one constituent element or a correlation between one constituent element and other constituent elements, as illustrated in the drawings. It should be understood that the spatially relative terms encompass different orientations of the elements in use or operation in addition to the orientation depicted in the drawings.

For example, if the constituent element in the drawings is turned over, the constituent element described as "below" or "beneath" the other constituent element may then be oriented "above" the other constituent element. Thus, the exemplary term "below" can encompass both orientations of above and below. The constituent elements may be oriented in different directions, and the spatially relative terms used herein may be interpreted in accordance with the orientations.

When one constituent element is described as being "connected" or "coupled" to another constituent element, it should be understood that one constituent element can be connected or coupled directly to another constituent element, and an intervening constituent element can also be present between the constituent elements. When one constituent element is described as being "connected directly to" or "coupled directly to" another constituent element, it should be understood that no intervening constituent element is present between the constituent elements.

The suffixes "module" and "unit" used to describe some constituent elements in the following description are used together or interchangeably in order to facilitate the description, but the suffixes themselves do not have distinguishable meanings or functions.

Objects and effects of the present disclosure and technical constituent elements for achieving the objects and effects will be clear with reference to the exemplary embodiments described in detail below together with the accompanying drawings. In addition, in the description of the present disclosure, the specific descriptions of publicly known functions or configurations will be omitted when it is determined that the specific descriptions may unnecessarily obscure the subject matter of the present disclosure. In addition, the terms used herein are defined considering the functions in the present disclosure and may vary depending on the intention or usual practice of a user or an operator.

However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Therefore, the definition of the terms should be made based on the entire contents of the technology of the present specification.

In the present disclosure, a lens may include a liquid crystal layer oriented variably according to a voltage so as to have a variable refractive index. In particular, the liquid crystal layer may have a changed arrangement state by a voltage applied to a transparent electrode. Accordingly, since a refractive index of light passing through the liquid crystal layer is changed, a refractive index of light passing through the lens may also be varied. In general, in the case of a three-dimensional (3D) image, as a location of an object existing in an image is changed, it may cause motion sickness or dizziness to a user. Herein, the 3D image is not limited to a three-dimensional image, and may include all of the images including a 3D object. Dizziness that the user feels when viewing a 3D image may occur especially when an object moves rapidly within the image. The IT motion sickness may be evaluated as a symptom caused by the body's inability to keep up with rapidly changing visual stimuli due to the limitations of the body's perceptual ability. If the perception phenomenon is assisted by additional ghost and distortion, and the like generated through image modulation, dizziness that may occur to the user may be significantly reduced. Further, when a frame rate of an image is low or an object is changed slowly within an image, dizziness that may occur to the user may be significantly reduced. Otherwise, although an actual frame rate of the image is not changed, when a speed at which the image projected to the eyes (or optic nerve) of the user viewing the image changes is delayed, dizziness that may occur to the user may be significantly reduced. Hereinafter, a method of delaying, by a lens, a speed at which an image is changed according to the present disclosure will be described with reference to FIGS. 1 to 6(b). Further, a method of changing a sudden change in an image to a change in a flexible form by generating ghost on an image by the lens according to the present disclosure will be described with reference to FIGS. 1 to 6(b).

Figure 2A:
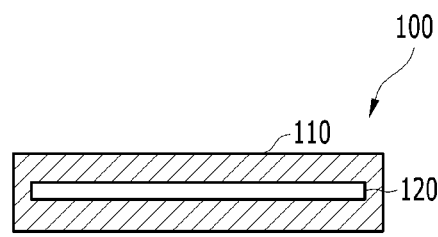
FIGS. 2(a)-2(b) are lateral cross-sectional views illustrating an example of a lens according to exemplary embodiments of the present disclosure.
Figure 2B:
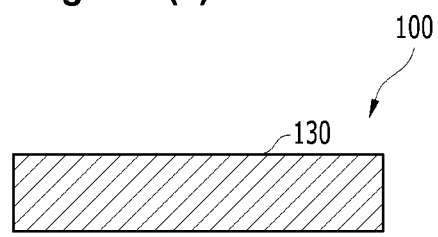

FIG. 1 is a block diagram illustrating an example of a lens according to exemplary embodiments of the present disclosure. FIGS. 2(a)-2(b) are lateral cross-sectional views illustrating an example of a lens according to exemplary embodiments of the present disclosure.

Referring to FIG. 1, a lens 100 may include a liquid crystal layer 110 and an optical unit 120. However, the foregoing constituent elements are not essential to implement the lens 100, so that the lens 100 may include more or fewer constituent elements than those listed above.

In the present disclosure, the lens 100 may mean an optical unit generating a variable focus by using an electroactive material. The lens 100 may include a liquid lens, an electric polymer, a liquid lens, and the like.

Hereinafter, for the convenience of the description, exemplary embodiments of the lens 100 according to the present disclosure will be described through an example including a liquid crystal lens having a variable focus. Herein, the liquid crystal lens may be a lens which is capable of allowing a refractive index of light passing through the lens to be changed by changing an arrangement state of liquid crystal molecules. Depending on an exemplary embodiment, the lens 100 may allow a refractive index of light passing through the lens 100 to be changed through the liquid crystal layer 110.

The liquid crystal layer 110 may be variably oriented according to a voltage so as to have a variable refractive index.

In particular, the liquid crystal layer 110 may change an arrangement state of the liquid crystal molecules according to the voltage applied from a transparent electrode. In this case, the refractive index of light passing through the liquid crystal layer 110 may be allowed to be changed.

In the present disclosure, the liquid crystal layer 110 may be formed of a plurality of regions, and the voltage applied to the liquid crystal layer 110 may be differently adjusted according to a plurality of regions to suppress aberration by differently adjusting a refractive index of the liquid crystal layer depending on a position on the lens 100.

The liquid crystal layer 110 may include at least one of a nematic liquid crystal, a smectic liquid crystal, a ferroelectric liquid crystal, and a chiral liquid crystal. Further, the liquid crystal layer 110 may include different types of liquid crystal to enable fine diopter control. However, the liquid crystal layer 110 is not limited thereto, and may include various types of liquid crystals.

In the present disclosure, a part of the liquid crystal layer 110 may also include a display unit which is capable of displaying information recognizable by a user of the lens 100 by blocking at least a part of light passing through the liquid crystal layer 110. The display unit may display visual information on a part of the lens 100 by blocking at least a part of light passing through the lens 100 by distortion of liquid crystal particles of the liquid crystal layer 110.

A transparent electrode may be formed with a predetermined pattern so as to apply a voltage according to a position on the lens 100 to the liquid crystal layer 110. For example, the transparent electrode may be formed of a plurality of electrodes disposed in an inner surface of the optical unit 120, and in this case, the plurality of electrodes of the transparent electrode may apply a voltage to the liquid crystal layer 110 in a vertical direction. In particular, the plurality of electrodes may be formed of one or more closed curves so as to apply a voltage according to a position on the lens 100 to the liquid crystal layer 110, and may be made of a material that allows light to pass through and has electrical conductivity. For another example, the transparent electrode may be formed of a plurality of electrodes disposed in a predetermined pattern (for example, a lattice pattern and a radiation pattern), and each electrode may also receive electricity through a via hole. However, the transparent electrode is not limited thereto, and may be formed of various methods.

According to exemplary embodiments of the present disclosure, the refractive index of the liquid crystal layer 110 is varied, so that the liquid crystal layer 110 may modulate a speed at which an image displayed on a display device is changed. According to the exemplary embodiment, the refractive index of the liquid crystal layer 110 is varied, so that the liquid crystal layer 110 may delay a speed at which an image displayed on a display device is changed. Throughout the specification, delaying the speed at which the image is changed does not mean to delay a playback speed of the image that is being reproduced on the display device, but may mean to delay the change speed of the image that a user feels. The speed at which the image that is being reproduced on the display device is changed is not changed, but the image passes through the liquid crystal layer 110 and is projected to the user's eyes, the user may feel as if the speed of the change from a first frame to a second frame is delayed. In particular, when an object included in the first frame moves from a second frame in a predetermined direction, the liquid crystal layer 110 may cause the user to feel as if the movement speed is delayed by generating a ghost or a distortion effect of the movement of the object. Therefore, the liquid crystal layer 110 delays the speed of the change of the image, but the total playback time period of a first image that passes through the liquid crystal layer 110 and is projected to the user's eyes may be the same as the total playback time period of a second image that is being displayed on the display device. Otherwise, the delay of the speed of the change of the image may also be implemented in subliminal perception of the user. That is, even though the speed of the change of the image is delayed, the user may not feel the delay of the speed.

According to exemplary embodiments of the present disclosure, the liquid crystal layer 110 may generate at least one effect of ghost, distortion, and blur according to the modulation of the speed of the change of the image.

Figures 3A, 3B, 3C:
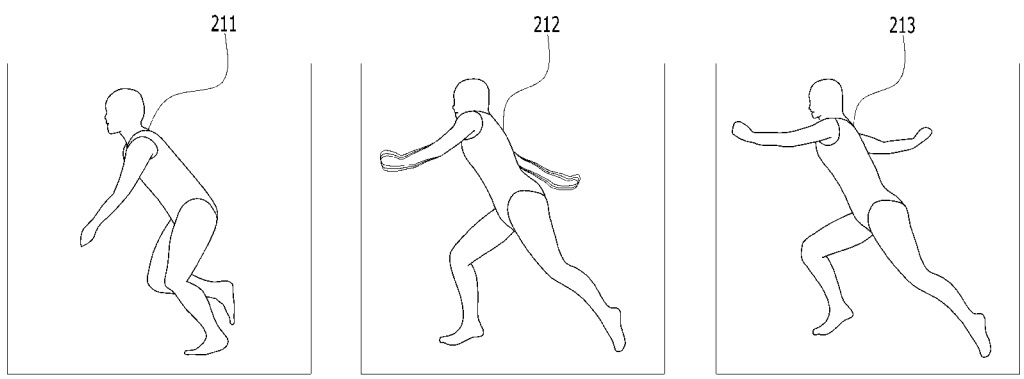
FIGS. 3(a)-3(c) are diagrams illustrating an example of a ghost effect generated by the lens according to exemplary embodiments of the present disclosure.
Figures 4A, 4B, 4C:
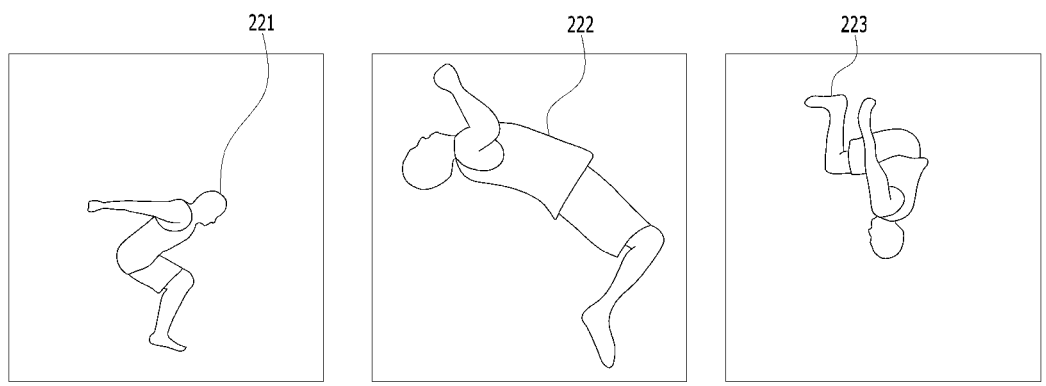
FIGS. 4(a)-4(c) are diagrams illustrating an example of a distortion effect generated by the lens according to exemplary embodiments of the present disclosure.

In particular, referring to FIGS. 3(a)-3(c), FIG. 3(a) may be an image corresponding to a first frame within an image. Further, FIG. 3(c) may be an image corresponding to a second frame within the image. A change from the first frame to the second frame may follow a predetermined playback speed of the image. As represented in FIG. 3(b), the liquid crystal layer 110 may delay the speed of the change of the image from the first frame to the second frame to generate a ghost effect. Otherwise, the liquid crystal layer 110 may also delay the speed of the change of the image by generating a ghost effect between the first frame and the second frame. In this case, dizziness that may occur to the user may be reduced or prevented.

In the meantime, the ghost effect generated by the liquid crystal layer 110 may not deteriorate the quality of the image displayed by the display device or projected to the eyes of the user. In general, when the image people watch is cut by frame and observed, it can be seen that the ghost effect appears. However, when the people watch the image, the people do not recognize the ghost and may perceive the image in which the ghost is generated as a natural image. In addition, the ghost effect generated by the liquid crystal layer 110 according to the present disclosure may be generated between the frame and the frame that is the minimum unit in the image. Accordingly, the liquid crystal layer 110 delays the speed of the change of the image, so that even though at least one effect between the ghost and the distortion is generated in the image, the user may not recognize the deterioration of the quality of the image. Hereinafter, an example of the method of generating at least one of the ghost effect and the distortion effect by the liquid crystal layer 110 according to the present disclosure will be described with reference to FIGS. 3(a)-3(c) and 4(a)-4(c).

According to exemplary embodiments of the present disclosure, the refractive index of the liquid crystal layer 110 is varied, thereby increasing the speed of the change of the image that is being displayed on the display device. Herein, the increase of the speed of the change of the image does not mean to increase the playback speed of the image that is being reproduced in the display device, but may mean to increase the speed of the change of the image that the user feels. The speed of the change of the image that is being reproduced in the display device is not changed, but when the image passes through the liquid crystal layer 110 and is projected to the eyes of the user, the user may feel as if the speed of the change from the first frame to the second frame increases. In particular, when the object included in the first frame moves in a predetermined direction in the second frame, the liquid crystal layer 110 generates the ghost effect or the distortion effect for the movement of the object to cause the user to feel as if the speed of the movement of the object increases. Therefore, the liquid crystal layer 110 increases the speed of the change of the image, but the total playback time period of the first image that passes through the liquid crystal layer 110 and is projected to the eyes of the user may be the same as the total playback time period of the second image displayed on the display device. Otherwise, the increase in the speed of the change of the image may be implemented under the perception of the user. That is, even though the speed of the change of the image increases, the user may not feel the increase in the speed of the change of the image.

According to exemplary embodiments of the present disclosure, the refractive index of the liquid crystal layer 110 is varied, so that the liquid crystal layer 110 may also modulate a phase of the image that is being displayed on the display device. Throughout the specification, the modulation of the phase of the image does not mean to modulate the phase of the image that is being reproduced in the display device, but may mean that the phase of the image that the user feels is modulated. The phase of the image that is being reproduced in the display device is not changed, but when the image passes through the liquid crystal layer 110 and is projected to the eyes of the user, the user may feel as if the phase of the image is modulated. In particular, when the object included in the first frame moves in the predetermined direction in the second frame, the liquid crystal layer 110 may cause the user to feel as if the effect, such as enlargement or reduction, is generated for the object. Otherwise, the modulation of the phase of the image may be implemented under the perception of the user. That is, even though the phase of the image is modulated, the user may not feel the modulation of the phase of the image.

In the meantime, referring to FIG. 1, the optical unit 120 may accommodate the liquid crystal layer 110 therein. Herein, the optical unit 120 may be glass-based crown glass, flint glass, titanium glass, or the like, but may form the outer shape of the lens 100. In addition, the optical unit 120 may include a polymer-based film and the like, as well as the foregoing example.

For example, referring to FIG. 2(a), the optical unit 120 may protect the liquid crystal layer 110 in the form of accommodating the liquid crystal layer 110 therein.

In the present disclosure, a transparent electrode (not illustrated) may be located at one side surface of the optical unit 120. For example, the transparent electrode may be located on an inner surface of the optical unit 120 that is in contact with the liquid crystal layer 110, and in this case, the transparent electrode may apply a voltage to the liquid crystal layer 110.

According to exemplary embodiments of the present disclosure, the lens 100 may be the lens located remotely of the display device. The display device may be a display device provided in a monitor, a TV, or a user terminal (for example, a tablet PC or a smart phone) or an image display device, such as an HMD or a projector. In this case, the lens 100 may be the lens provided in the glasses and the like, and the user may wear the glasses provided with the lens 100 and watch the image displayed on the display device. For another example, the lens 100 may also be a smart lens or a smart contact lens. Herein, the smart lens may be a wearable electronic device which further includes a wireless antenna, a chip, and a patterning substrate for receiving power. Hereinafter, the particular contents for the smart lens are discussed in detail in "Korean Patent No. 10-2050295" which is incorporated as a reference in the present application.

The lens 100 according to the present disclosure is the glasses or the smart lens and is remotely located from the display device, so that the lens 100 may be present closer to the user's eye than the display unit of the display device.

According to exemplary embodiments of the present disclosure, when the lens 100 is located remotely from the display device, the lens 100 may be driven independently of the display device.

In particular, the lens 100 is not driven under the control of the display device, but may be separately driven from the display device. However, the lens 100 may receive information and the like about the image displayed on the display device from the display device through a communication unit. In this case, the lens 100 may be operated based on the information about the image.

For example, the lens 100 may receive information on a frame rate of the image that is being displayed on the display device from the display device. Herein, the frame rate may be a numerical value representing a speed at which a frame is viewed, and may be expressed as frames per second (fps) as the same or synonymous word. When the frame rate is received, the lens 100 may adjust a voltage applied to the liquid crystal layer 110 through the transparent electrode based on the frame rate of the image. Accordingly, the refractive index of the liquid crystal layer 110 is varied, so that the lens 100 may delay the speed of the change of the image that is being displayed on the display device.

According to exemplary embodiments of the present disclosure, when the frame rate of the image is equal to or larger than a predetermined value, the lens 100 may vary the refractive index of the liquid crystal layer 110 by adjusting the voltage applied to the liquid crystal layer 110 through the transparent electrode. When the frame rate of the image is equal to or less than the predetermined value, the phenomenon of causing dizziness to the user may be less, so that the lens 100 may vary the refractive index of the liquid crystal layer 110 only when the frame rate of the image is equal to or larger than the predetermined value. In this case, since the lens 100 does not control the operation of the liquid crystal layer 110 for all images, power usage of the battery and the like may be reduced. In particular, when the lens 100 according to the present disclosure is the smart lens, there is a great need to save the power of the battery, so that the lens 100 may control the operation of the liquid crystal layer 110 based on the frame rate of the image.

In the present disclosure, the lens 100 may also repeatedly adjust the voltage transmitted to the liquid crystal layer 110 at a predetermined interval according to a preset value. For example, the power applied to the lens 100 may be an alternating current. The alternating current may be power of which a magnitude and a direction are periodically changed over time, and thus, the voltage transmitted to the liquid crystal layer 110 may be repeatedly changed at a predetermined interval. Therefore, the refractive index of the liquid crystal layer 110 may be repeatedly varied at a predetermined interval.

According to the exemplary embodiments of the present disclosure, the amount of change in the refractive index of the liquid crystal layer 110 may also be determined based on the frame rate of the image that is being displayed on the display device. Herein, the amount of change may represent the degree of the change of the refractive index. For example, when the amount of change is small, an angle at which light passing through the liquid crystal layer 110 is refracted may be small. Conversely, when the amount of change is large, an angle at which light passing through the liquid crystal layer 110 is refracted may be large.

For example, a first change amount of the refractive index determined by the lens 100 when the frame rate of the image is equal to or larger than the predetermined value may be larger than a second change amount of the refractive index determined by the lens 100 when the frame rate of the image is smaller than the predetermined value. That is, when a playback speed of the image is large, the lens 100 may adjust the voltage applied to the liquid crystal layer 110 so that the refractive angle of the light passing through the liquid crystal layer 110 increases. Further, when a playback speed of the image is small, the lens 100 may adjust the voltage applied to the liquid crystal layer 110 so that the refractive angle of the light passing through the liquid crystal layer 110 decreases. However, the present disclosure is not limited thereto.

According to exemplary embodiments of the present disclosure, the lens 100 may also vary the refractive index of the liquid crystal layer 110 based on the change of at least one object included in the image.

For example, the lens 100 may vary the refractive index of the liquid crystal layer 110 when at least one object included in the image moves from distal to proximal or from proximal to distal. For another example, the lens 100 may vary the refractive index of the liquid crystal layer 110 when a size of at least one object included in the image increases or decreases.

According to exemplary embodiments of the present disclosure, when at least one object included in the image moves only in the left and right directions, the lens 100 may vary only the arrangement state in the left and right directions of the liquid crystal layer 110 without varying the refractive index of the liquid crystal layer 110. In this case, the image formed on the eyes of the user may be moved in the left and right directions. That is, the arrangement state of the left and right directions of the liquid crystal layer 110 is varied, so that the user may feel that at least one object moves in the left and right directions, and thus, the user may feel that the speed of the change of the object is delayed.

For example, the object present at a first location in the first frame may be present at a second location located to the right of the first position in the second frame. In this case, the liquid crystal layer 110 may cause the user to feel that the object is present between the first location and the second location in the process in which the object moves from the first location to the second location while the image is changed from the first frame to the second frame. Therefore, dizziness that may occur to the user may be reduced or prevented.

According to exemplary embodiments of the present disclosure, the lens 100 may gradually vary the refractive index of the liquid crystal layer 110 in response to the speed of the change of at least one object included in the image.

For example, the lens 100 may vary the refractive index of the liquid crystal layer 110 at the same speed as the speed of the change of at least one object. For example, the lens 100 may vary the refractive index of the liquid crystal layer 110 at the speed similar to the speed of the change of at least one object. For example, the lens 100 may create a ghost by a method of changing an image size, an image speed, and the like according to the variation of the refractive index of the liquid crystal layer 110 at the speed similar to the speed of the change of at least one object. Herein, the speed of the change of at least one object may be determined based on the information received from the display device.

According to exemplary embodiments of the present disclosure, the lens 100 may also provide a variable focus through the liquid crystal layer 110 for correcting the eyesight of the user. For example, there may be a user having difficulty focusing on an image that is being displayed on the display device due to presbyopia, myopia, or farsightedness. Accordingly, the lens 100 may vary the focus of the lens 100 by varying the refractive index of the liquid crystal layer 110. The lens 100 may vary the refractive index of the liquid crystal layer 110 based on the varied focus to modulate the speed of the change of the image that is being displayed on the display device.

According to the exemplary embodiments of the present disclosure, the lens 100 may further an arrangement maintaining module. When the power supply of the lens 100 is interrupted, the arrangement maintaining module may maintain the arrangement state of the liquid crystal layer 110 in order to prevent the change of the refractive index due to the return of the arrangement state of the liquid crystal layer 110 to the original state. When the power supply of the lens 100 is interrupted, the arrangement state of the liquid crystal layer 110 may be rapidly returned to the original state. In this case, the user may feel inconvenience due to the rapidly changed refractive index of the liquid crystal layer 110. Therefore, in order to prevent the user from feeling inconvenience due to the rapid change in the refractive index, the arrangement maintaining module may maintain the arrangement state of the liquid crystal layer 110 even when the power supply of the lens 100 is interrupted. For example, the arrangement maintaining module may maintain the arrangement state of the liquid crystal layer 110 by supplying direct-current power to the transparent electrodes and making the transparent electrode be short-circuited.

The arrangement maintaining module may make the arrangement state of the liquid crystal layer 110 be returned to a predetermined state when the power supply of the lens 100 is interrupted. The arrangement maintaining module may maintain the arrangement state of the liquid crystal or make the arrangement state of the liquid crystal be returned to the predetermined state by applying a magnetic field to the liquid crystal layer 110 by using a permanent magnet and the like. Further, the arrangement maintaining module may maintain the arrangement state of the liquid crystal layer 110 or make the arrangement state of the liquid crystal layer 110 be returned to the predetermined state by applying an influence, such as an electric field, a magnetic field temperature, and stress, to the liquid crystal layer 110.

In the meantime, referring to FIG. 2(b), the lens 100 may also further include an optical module 130 which induces a change in a physical property of the internal material and changes a refractive index. Herein, the optical module may be a module which induces a change in a physical property, such as a phase variation or arrangement, of the material by an electric operation to have a changed refractive index. As the refractive index of the optical module 130 is varied, the optical module 130 may modulate at least one of the speed of the change of the image that is being displayed on the display device and a phase of the image. According to the exemplary embodiment, as the refractive index of the optical module 130 is varied, the optical module 130 may delay the speed of the change of the image that is being displayed on the display device or virtually enlarge or reduce the image. Herein, the virtual enlargement or reduction of the image may be separate from the actual enlargement or reduction of the image that is being displayed on the display device. For example, the virtual enlargement or reduction of the image may mean that the image that passes through the optical module 130 and is projected to the eyes of the user is enlarged or reduced without the change in the image that is being reproduced in the display device.

In the meantime, according to other exemplary embodiments of the present disclosure, the lens 100 may be a lens combinable to the display device.

In particular, referring to FIG. 1 again, when the lens 100 according to the present disclosure is a lens combinable to the display device, a display device 1000 may include the lens 100, a display unit 200, a control unit 300, and an eye tracker 400. However, the present disclosure is not limited thereto.

According to the exemplary embodiment, the display device 1000 may be a Head Mounted Display (HMD) device that is worn on a user's head and provides an image directly in front of the user's eyes. The HMD device may be the device capable of providing at least one of Virtual Reality (VR), Augmented Reality (AR), and Mixed or Merged Reality (MR). According to the exemplary embodiment, the HMD device may also be a smart glass. The smart glasses is the device that provides both the original function of glasses for viewing objects in front and the computing function, and may be a see-through HMD device having a frame in the form of glasses.

The display unit 200 may display (output) information processed in the display device 1000. For example, the display unit 200 may display execution screen information or an image of an application program driven in the display device 1000.

According to the exemplary embodiments of the present disclosure, the lens 100 may be provided to be present closer to the eyes of the user using the display device 1000, than the display unit 200. Accordingly, the image reproduced in the display unit 200 may pass through the lens 100 and be projected to the eyes of the user. In this case, the refractive index of the liquid crystal layer 110 of the lens 100 is varied, so that the speed of the change of the image that is being displayed on the display unit 200 may be modulated.

According to the exemplary embodiments of the present disclosure, the lens 100 may have a concave (or convex) shape so that light incident from the front in all directions can be equally refracted. Depending on the exemplary embodiment, when the display device 1000 is the HMD Device, the display device 1000 may provide an image formed in all directions (for example, 360 degrees) based on the user wearing the display device 1000. Accordingly, the lens 100 may be formed in the concave (or convex) shape so as to equally provide the variable refractive index to the image projected toward the eyes of the user in all directions. For example, the lens 100 may have a hemispherical shell shape, and for example, the lens 100 may also have a shape similar to that of a contact lens. However, the present disclosure is not limited thereto.

The control unit 300 may process the general operation of the display device 1000. The control unit 300 may provide or process appropriate information or functions to the user by processing a signal, data, information, and the like input or output through the foregoing constituent elements or driving the application program stored in the memory.

According to the exemplary embodiment, the control unit 300 may adjust the voltage applied to the liquid crystal layer 110 through the transparent electrode. In this case, the refractive index of the liquid crystal layer 110 is varied, so that the speed of the change of the image that is being displayed on the display unit 200 may be modulated. However, the transparent electrode is not driven under the control of the control unit 300, and may also be independently driven. For example, the transparent electrode may repeatedly apply the voltage to the liquid crystal layer 110 at a predetermined interval by a preset value. In this case, the transparent electrode may adjust the voltage transmitted to the liquid crystal layer 110 without the control of the control unit 300. That is, the lens 100 combinable to the display unit 1000 may also be driven under the control of the control unit 300, or may also be independently driven.

The eye tracker 400 may tract the user's eyes.

In particular, the eye tracker 400 may detect a direction of the user's eyes toward a specific region on the display unit 200 by detecting a region on the display unit 200 corresponding to the location of the pupil of the user.

In the present disclosure, the eye tracker 400 may also detect the direction of the user's eyes based on an image in which the user's eyes are photographed. For example, the display device 1000 may further include a camera unit for photographing the eyes of the user. The eye tracker 400 may determine a distance between the pupils, a distance between the eyes, a 3D location of each eye for the display device 1000, sizes of distortion and rotation, and eye directions of both eyes by using the image in which the eyes of the user are photographed.

According to the exemplary embodiments of the present disclosure, the control unit 300 of the display device 1000 may vary the refractive index of the liquid crystal layer 110 based on the change of the object determined that the user gazes through the eye tracker 400 among at least one object included in the image.

For example, when the object determined that the user gazes within the image moves from distal to proximal or from proximal to distal, the control unit 300 may vary the refractive index of the liquid crystal layer 110. For another example, when a size of the object determined that the user gazes within the image increases or decreases, the control unit 300 may vary the refractive index of the liquid crystal layer 110. In this case, the refractive index of the liquid crystal layer 110 is varied, so that the liquid crystal layer 110 may delay the speed of the change of the object that is being displayed on the display unit 200 and gazed by the user.

According to the exemplary embodiments of the present disclosure, the control unit 300 of the display device 1000 may gradually vary the refractive index of the liquid crystal layer 110 in response to the speed of the change of at least one object included in the image.

In particular, the control unit 300 may determine the speed of the change of the object determined to be gazed by the user within the image. The control unit 300 may gradually vary the refractive index of the liquid crystal layer 110 in response to the determined speed of the change of the object.

For example, the control unit 300 may vary the refractive index of the liquid crystal layer 110 at the same speed as the speed of the change of the object determined to be gazed by the user. For another example, the control unit 300 may vary the refractive index of the liquid crystal layer 110 at the similar speed to the speed of the change of the object determined to be gazed by the user.

According to the exemplary embodiments of the present disclosure, the control unit 300 of the display device 1000 may also vary the refractive index of the lens 100 based on a gaze point of the user detected through the eye tracker 400. Herein, the gaze point may mean a point which the user looks at within the display unit 200, and may have a three-dimensional position coordinate value. Therefore, the gaze point may represent a depth of the user's eyes. The control unit 300 may determine a focal distance between the object, which is being displayed on the display unit 200 and which the user is gazing at, and the eyes of the user. When the focal distance is determined, the control unit 300 may determine whether the gaze point of the user matches the focal distance. When the focal distance does not match the gaze point of the user, the control unit 300 may vary the refractive index of the lens 100 so that the focal distance matches the gaze point of the user. This is because, when the gaze point does not match the focal distance, it may indicate that the user has difficulty in focusing on the object that is being displayed on the display unit 200 due to presbyopia, nearsightedness, or farsightedness. Therefore, the control unit 300 may correct the eyesight of the user by varying the refractive index of the lens 100. When the refractive index for correcting the eyesight of the user is determined, the control unit 300 may vary the refractive index of the lens 100 based on the refractive index varied for correcting the eyesight of the user. That is, the control unit 300 may also modulate the speed of the change of the image that is being displayed on the display unit 200 by providing the variable refractive index for correcting the eyesight of the user and changing the refractive index of the lens 100 in the state where the eyesight of the user is corrected.

In the present disclosure, the display device 1000 may further include a user input unit. The user input unit may allow the user to change an operation mode of the lens 100 in order to change the operation mode of the lens 100 to a long-range mode, a medium-range distance mode, or a short-range mode depending on the distance of the object which the user desires to see. The user may continuously change the focus of the lens 100 through the user input unit, or discontinuously change the focus of the lens 100 according to a predetermined mode.

According to the exemplary embodiments of the present disclosure, when the object determined that the user is gazing at within the image moves only in the left and right directions, the control unit 300 may vary only the left and right directional arrangement state of the liquid crystal layer 110 without varying the refractive index of the liquid crystal layer 110. In this case, the image formed on the eyes of the user may be moved in the left and right directions. That is, the left and right directional arrangement state of the liquid crystal layer 110 is varied, so that the user may feel that the object that the user is gazing at is moved in the left and right directions, and thus, the user may feel that the speed of the change of the object is delayed.

For example, when the object present at the first location in the first frame may be present at the second location located to the right of the first location in the second frame. In this case, the liquid crystal layer 110 may cause the user to feel that the object is present between the first location and the second location while the image is changed from the first frame to the second frame. Therefore, dizziness that may occur to the user may be reduced or prevented.

According to the exemplary embodiments of the present disclosure, the control unit 300 of the display device 1000 may also vary only the left and right directional arrangement state of the liquid crystal layer 110 based on the gaze point of the user detected through the eye tracker 400. For example, when the user has astigmatism, a gap may exist between the gaze point of the user and the object displayed on the display unit 200 in the left and right directions. Therefore, when the user has astigmatism, the control unit 300 may also vary only the left and right directional arrangement state of the liquid crystal layer 110 so that the astigmatism of the user can be corrected. The control unit 300 may vary the refractive index of the liquid crystal layer 110 based on the varied left and right directional arrangement state. That is, the control unit 300 may also modulate the speed of the change of the image that is being displayed on the display unit 200 by providing the arrangement state of the liquid crystal layer 110 for correcting astigmatism of the user and changing the refractive index of the liquid crystal layer 110 in the state where the astigmatism of the user is corrected.

According to the exemplary embodiments of the present disclosure, the control unit 300 of the display device 1000 may also vary the refractive index of the liquid crystal layer 110 based on a frame rate of the image that is being displayed on the display unit 200.

In particular, the control unit 300 may recognize a frame rate of the image that is being displayed on the display unit 200. When the frame rate of the image is equal to or larger than a predetermined value, the control unit 300 may vary the refractive index of the liquid crystal layer 110 by adjusting the voltage applied to the liquid crystal layer 110 through the transparent electrode. When the frame rate of the image is equal to or smaller than the predetermined value, that is, the frame rate of the image is slow, the phenomenon of causing dizziness to the user is less, so that the control unit 300 may vary the refractive index of the liquid crystal layer 110 only when the frame rate of the image is equal to or larger than the predetermined value. In this case, since the control unit 300 does not control the operation of the liquid crystal layer 110 for all images, the resources used by the control unit 300 may be saved.

In the present disclosure, the control unit 300 may also repeatedly adjust the voltage transmitted to the liquid crystal layer 110 at a predetermined interval according to a preset value. In this case, the refractive index of the liquid crystal layer 110 may be repeatedly varied at the predetermined interval.

According to the exemplary embodiments of the present disclosure, the amount of change of the refractive index may be determined based on the frame rate of the image that is being displayed on the display unit 200 of the display device 1000.

For example, a first change amount of the refractive index determined by the control unit 300 of the display device 1000 when the frame rate of the image is equal to or larger than the predetermined value may be larger than a second change amount of the refractive index determined when the frame rate of the image is smaller than the predetermined value. That is, when the playback speed of the image is large, the control unit 300 may adjust the voltage applied to the liquid crystal layer 110 so that the angle at which the light passing through the liquid crystal layer 110 is refracted increases. Further, when the playback speed of the image is small, the control unit 300 may adjust the voltage applied to the liquid crystal layer 110 so that the angle at which the light passing through the liquid crystal layer 110 is refracted decreases. However, the present disclosure is not limited thereto.

According to the foregoing configuration, the lens 100 is combined with the display device, so that the refractive index of the lens 100 may be varied under the control of the display device, or the lens 100 is remotely located from the display device and is independently driven, so that the refractive index of the lens 100 may be varied. The refractive index of the lens 100 is varied, thereby delaying the speed of the change of the image that is being displayed on the display device. The lens 100 delays the speed of the change of the image, thereby generating at least one of the ghost effect and the distortion effect. In this case, dizziness or motion sickness that may occur to the user when the user watches the 3D image through the display device may be prevented or reduced.

In the meantime, according to the exemplary embodiments of the present disclosure, the lens 100 may generate the ghost effect between the frame and the frame. Hereinafter, an example of the ghost effect generated by the lens 100 according to the present disclosure will be described with reference to FIGS. 3(*a*)-3(*c*).

FIGS. 3(*a*)-3(*c*) are diagrams illustrating an example of a ghost effect generated by the lens according to exemplary embodiments of the present disclosure.

FIG. 3(*a*) may be the image corresponding to a first frame within the image that is being displayed on the display device. FIG. 3(*c*) may be the image corresponding to a second frame within the image. The second frame may be the frame immediately subsequent to the first frame. For example, when the image that is being displayed on the display device is the image having 30 frames per second (fps), a first frame may be the first frame among the 30 frames, and a second frame may be the second frame among the 30 frames. Further, a first object 211 in the first frame and a second object 213 in the second frame may be the same, but may be the objects of which positions or movements are changed. The lens 100 may generate a ghost effect by delaying the speed of the change of the first frame to the second frame within the image. According to the exemplary embodiment, FIG. 3(*b*) may be a third frame, in which the ghost effect is generated, between the first frame and the second frame. The lens 100 delays the speed of the change of the image, so that the ghost effect may be generated in a third object 212 of the third frame. Herein, the third frame and the third object 212 may be the frame and the object that are not actually present, and may be the figure inserted for the convenience of the description. That is, the third frame may be the frame reproduced under the perception of the user. Therefore, the lens 100 generates the ghost effect in the third frame or the third object 212 between the first frame and the second frame, thereby preventing dizziness that may occur to the user. In addition, the third frame is the frame reproduced under the perception of the user, and even though the lens 100 delays the speed of the change of the image, the problem in that the quality of the image deteriorates does not incur.

In the meantime, according to the exemplary embodiments of the present disclosure, the lens 100 may generate a distortion effect between the frame and the frame. Herein, the distortion may be the effect of changing the size or shape of at least one object included in the image. Hereinafter, an example of the distortion effect generated by the lens 100 according to the present disclosure will be described with reference to FIGS. 4(*a*)-4(*c*).

FIGS. 4(*a*)-4(*c*) are diagrams illustrating an example of a distortion effect generated by the lens according to exemplary embodiments of the present disclosure.

FIG. 4(*a*) may be the image corresponding to a first frame within the image that is being displayed on the display device. FIG. 4(*c*) may be the image corresponding to a second frame within the image. The second frame may be the frame immediately subsequent to the first frame. For example, when the image that is being displayed on the display device is the image having 30 frames per second (fps), a first frame may be the first frame among the 30 frames, and a second frame may be the second frame among the 30 frames. Further, a first object 221 in the first frame and a second object 213 in the second frame may be the same, but may be the objects of which positions or movements are changed. The lens 100 may generate a distortion effect by delaying the speed of the change of the first frame to the second frame within the image. Herein, the distortion may be the effect of changing the size or shape of at least one object included in the image. According to the exemplary embodiment, FIG. 4(*b*) may be a third frame, in which the distortion effect is generated, between the first frame and the second frame. The lens 100 delays the speed of the change of the image, thereby generating the distortion effect in a third object 222 of the third frame. In particular, referring to the third object 222, the third object 222 may become larger than the first object 221 and the second object 223. However, the present disclosure is not limited thereto, and the third object 222 may become smaller than the first object 221 and the second object 223, or the shape of the third object 222 may be slightly transformed. Herein, the third frame and the third object 222 may be the frame and the object that are not actually present, and may be the figure inserted for the convenience of the description. That is, the third frame may be the frame reproduced under the perception of the user. Therefore, the lens 100 generates the distortion effect in the third frame or the third object 222 between the first frame and the second frame, thereby preventing dizziness that may occur to the user. In addition, the third frame is the frame reproduced under the perception of the user, and even though the lens 100 delays the speed of the change of the image, the problem in that the quality of the image deteriorates may not be incurred.

According to the exemplary embodiments of the present disclosure, the refractive index of the lens 100 is varied, so that the lens 100 may also modulate a phase of the image that is being displayed on the display device. That is, the lens 100 may also modulate only the phase of the image without modulating the speed of the image that is being displayed on the display device. According to the exemplary embodiment, FIG. 4(*b*) may be the third frame, in which the phase of the image is modulated, between the first frame and the second frame. In particular, referring to the third object 222, the phase of the image is modulated, so that the third object 222 may become larger than the first object 221 and the second object 223. However, the present disclosure is not limited thereto, the phase of the image is modulated, so that the third object 222 may become smaller than the first object 221 and the second object 223, or the shape of the third object 222 may also be slightly transformed.

In the meantime, according to the exemplary embodiments of the present disclosure, the lens 100 may be provided so as to be present closer to the eyes of the user using the display device, than the display unit of the display device. According to the exemplary embodiment, the lens 100 may be the lens remotely located from the display device. In this case, the lens 100 is provided to the glasses of the user or is worn on the eyes of the user as a smart lens, so that the lens 100 may be present closer to the eye of the user than the display device. According to another exemplary embodiment, the lens 100 may be the lens combinable to the display device. For example, the display device may be an HMD device. In this case, the lens 100 may be combined so as to be present to be closer to the eye of the user than the display unit of the HMD device within the HMD device. As described in the example, even when the lens 100 is located remotely from the display device and is combined with the display device, the lens 100 may be provided to be closer to the eye of the user than the display device. Therefore, the image displayed through the display device may pass through the lens 100 and be projected to the eyes of the user. Hereinafter, an example of a location relationship between the lens 100 according to the present disclosure and the display device will be described with reference to FIG. 5.

Figure 5:
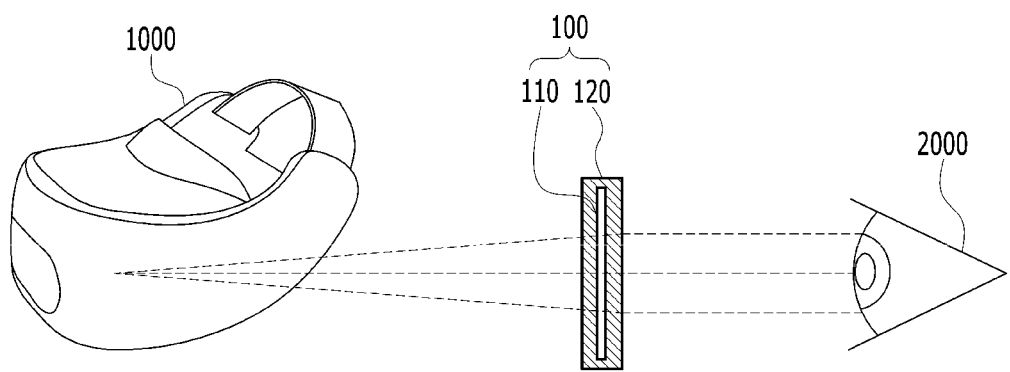
FIG. 5 is a diagram illustrating an example for a location relationship between the lens according to the present disclosure and a display device.

FIG. 5 is a diagram illustrating an example for a location relationship between the lens according to the present disclosure and a display device.

Referring to FIG. 5, the lens 100 may be located between the display device 1000 and the eye 2000 of the user. For example, the display device 1000 may be an HMD device. In this case, the lens 100 is combined with the display device 1000, and may be combined to be located closer to the eye 2000 of the user than the display unit of the display device 1000. Accordingly, the image displayed through the display device 1000 may pass through the lens 100 and be projected to the eye 2000 of the user. Therefore, the refractive index of the lens 100 is varied, so that the lens 100 may modulate the speed of the change of the image that is being displayed on the display device 1000.

According to the exemplary embodiments of the present disclosure, even when the display device 1000 is the HMD device, the lens 100 may be the lens located remotely from the display device 1000. For example, the lens 100 may be the lens provided to the glasses of the user or may be the smart lens. In this case, the lens 100 may be located inside the display device 1000, but may be independently driven without being combined with the display device 1000.

According to other exemplary embodiments of the present disclosure, the display device may be a monitor, a TV, or a display device provided in a user terminal (for example, a tablet PC or a smart phone). In this case, the user is capable of watching the image displayed on the display device through the lens 100 provided to the glasses of the user or the lens 100 implemented as a smart lens and the like. Therefore, the image that is being displayed through the display device may pass through the lens 100 and be projected to the eye 2000 of the user. Therefore, the refractive index of the lens 100 is varied, so that the lens 100 may also modulate the speed of the change of the image that is being displayed on the display device.

In the meantime, according to the exemplary embodiments of the present disclosure, the lens 100 may also vary the refractive index of the liquid crystal layer 110 based on the change of at least one object included in the image. Hereinafter, a method of varying, by the lens 100 according to the present disclosure, a refractive index of the liquid crystal layer 110 based on a change in at least one object will be described with reference to FIGS. 6(a)-6(b).

Figure 6A:
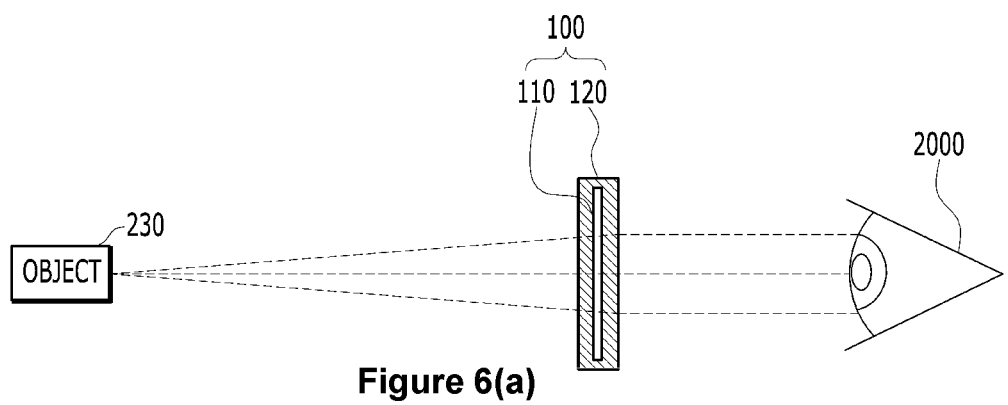
FIGS. 6(a)-6(b) are diagrams illustrating an example of a method of varying, by the lens, a refractive index based on a change in at least one object according to exemplary embodiments of the present disclosure.
Figure 6B:
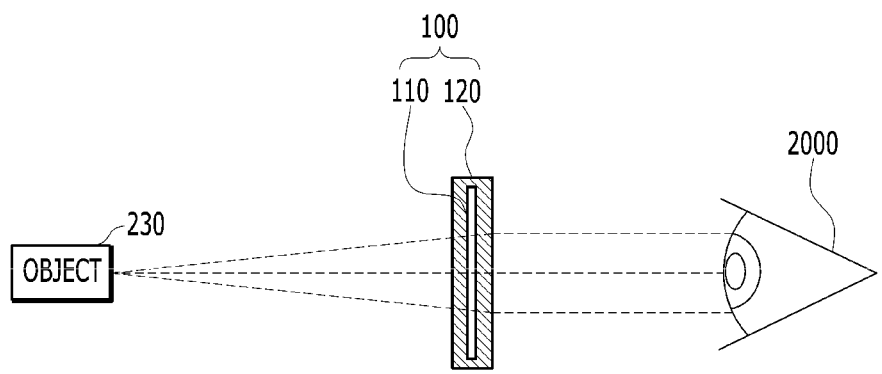

FIGS. 6(a)-6(b) are diagrams illustrating an example of a method of varying, by the lens, a refractive index based on a change in at least one object according to exemplary embodiments of the present disclosure.

Referring to FIG. 6(a), the eye 2000 of the user may gaze on an object 230 which passed through the lens 100 and is being displayed on the display device. A location of the object 230 that is being displayed on the display device may be changed within the image. For example, referring to FIG. 6(b), the object 230 may be moved from distal to proximal within the image. In this case, the lens 100 may vary the refractive index of the liquid crystal layer 110, thereby delaying a speed of a change of the object 230 that passes through the lens 100 and is projected to the eye 2000 of the user. For another example, the lens 100 may also vary the refractive index of the liquid crystal layer 110 when a size of the object 230 increases or decreases within the image. Therefore, the lens 100 may delay the speed of the change of the object 230 that passes through the lens 100 and is projected to the eye 2000 of the user, and prevent dizziness or motion sickness of the user.

According to the exemplary embodiments of the present disclosure, the control unit 300 of the display device 1000 may also correct the eyesight of the user by varying the refractive index of the lens 100. When at least one object that is being displayed on the display device 1000 moves from distal to proximal or moves from proximal to distal as illustrated in FIGS. 6(a)-6(b), a user with presbyopia may have difficulty in focusing on the object according to the movement of the object. Therefore, the control unit 300 may correct the eyesight of the user by varying the refractive index of the lens 100. When the refractive index for correcting the eyesight of the user is determined, the control unit 300 may vary the refractive index of the lens 100 based on the refractive index varied for correcting the eyesight of the user. That is, the control unit 300 may also modulate the speed of the change of the image that is being displayed on the display unit 200 by providing the variable refractive index for correcting the eyesight of the user and changing the refractive index of the lens 100 in the state where the eyesight of the user is corrected.

As described with reference to FIGS. 1 to 6(b), the lens 100 according to the present disclosure may include the liquid crystal layer 110 having the variable refractive index. The lens 100 varies the refractive index of the liquid crystal layer 110, thereby modulating the speed of the change of the image that is being displayed on the display device. According to the exemplary embodiment, the lens 100 delays the speed of the change of the image, thereby generating at least one of the ghost effect and the distortion effect. In this case, even though the user watches the 3D image through the display device, dizziness or motion sickness may be prevented or reduced. In addition, the ghost or distortion effect generated by the lens 100 may be generated between the frame and the frame that is the minimum unit in the image. Therefore, even though the lens 100 delays the speed of the change of the image, the quality of the image does not deteriorate, and the user may comfortably watch the image. In addition, the lens 100 may provide the variable focus for correcting presbyopia, myopia, or farsightedness of the user, and further, may also provide the arrangement state of the liquid crystal layer 110 for correcting astigmatism. Therefore, the user having presbyopia, myopia, farsightedness, or astigmatism is also capable of watching the image that is being displayed on the display device through the lens 100 according to the present disclosure, and in this case, dizziness or motion sickness that may occur to the user may be resolved.

The description of the presented exemplary embodiments is provided to enable any person skilled in the art of the present disclosure to make or use the present disclosure. Various modifications to the exemplary embodiments will be apparent to those skilled in the art of the present disclosure, and the generic principles defined herein may be applied to other exemplary embodiments without departing from the scope of the present disclosure. Accordingly, it should be construed that the present disclosure is not be limited to the exemplary embodiments presented herein but is in the broadest scope consistent with the principles and novel features presented herein.

What is claimed is:

1. A lens located remotely from a display device, the lens comprising:
   an optical unit configured to induce a change in a physical property of an internal material and change a refractive index when voltage is applied, wherein the optical unit modulates at least one of a speed of a change of an image and a phase of the image by varying the refractive index based on a change of at least one object included in the image being displayed on the display device.

2. The lens of claim 1, wherein the lens is provided so as to be present closer to eyes of a user using the display device than a display unit of the display device.

3. The lens of claim 1, wherein the optical unit delays the speed of the change of the image being displayed on the display device by varying the refractive index, or virtually enlarges or reduces the image being displayed on the display device by varying the refractive index.

4. The lens of claim 3, wherein the optical unit delays the speed of the change of the image being displayed on the display device by varying the refractive index, and a first total playback time period of a first image that passes through the optical unit and is projected to eyes of a user is the same as a second total playback time period of a second image being displayed on the display device.

5. The lens of claim 1, wherein the optical unit generates at least one of a ghost effect and a distortion effect by modulating the speed of the change of the image.

6. The lens of claim 1, wherein the refractive index of the optical unit may be varied based on a frame rate of the image being displayed on the display device.

7. The lens of claim 1, wherein amount of change of the refractive index is determined based on a frame rate of the image being displayed on the display device.

8. The lens of claim 1, wherein the refractive index of the optical unit is varied when the at least one object moves from proximal to distal or the at least one object moves from distal to proximal within the image.

9. The lens of claim 1, wherein the refractive index of the optical unit is varied when a size of the at least one object increases or decreases within the image.

10. The lens of claim 1, wherein when the at least one object moves only in left or right directions within the image, the refractive index of the optical unit is not varied, and only a left and right directional arrangement state of the optical unit is varied.

11. The lens of claim 1, wherein amount of change of the refractive index is determined based on the degree of change of the at least one object included in the image.

12. The lens of claim 1, wherein the refractive index of the optical unit is gradually varied in response to a changing speed of the at least one object included in the image.

13. A lens combinable to a display device, the lens comprising:

an optical unit configured to induce a change in a physical property of an internal material and change a refractive index, wherein the optical unit modulates at least one of a speed of a change of an image and a phase of the image by varying the refractive index based on a change of at least one object included in the image being displayed on the display device.

14. A display device, comprising:
a display unit;
a control unit; and
a lens including an optical unit that changes a refractive index by inducing a change in a physical property of an internal material,
wherein the optical unit modulates at least one of a speed of a change of an image and a phase of the image by varying the refractive index based on a change of at least one object included in the image being displayed on the display device.

15. The display device of claim 14, wherein the lens is provided so as to be present closer to eyes of a user than the display unit.

16. The display device of claim 14, wherein the optical unit delays the speed of the change of the image being displayed on the display device by varying the refractive index under control of the control unit, or virtually enlarges or reduces the image being displayed on the display device by varying the refractive index under control of the control unit.

17. The display device of claim 14, wherein the optical unit generates at least one of a ghost effect and a distortion effect by modulating the speed of the change of the image.

18. The display device of claim 14, further comprising:
an eye tracker configured to track user's eyes,
wherein the control unit varies the refractive index of the optical unit based on a change of an object determined that the user gazes through the eye tracker among at least one object included in the image.

19. The display device of claim 14, wherein the display device is a Head Mounted Display (HMD) device.

* * * * *